United States Patent
Berstein et al.

(10) Patent No.: US 6,744,887 B1
(45) Date of Patent: Jun. 1, 2004

(54) ACOUSTIC ECHO PROCESSING SYSTEM

(75) Inventors: Alberto D. Berstein, Cupertino, CA (US); Abraham Wei, Saratoga, CA (US); Tom Wei, San Jose, CA (US)

(73) Assignee: Zhone Technologies, Inc., Oakland, CA (US)

( * ) Notice: Subject to any disclaimer, the term of this patent is extended or adjusted under 35 U.S.C. 154(b) by 0 days.

(21) Appl. No.: 09/412,293

(22) Filed: Oct. 5, 1999

(51) Int. Cl.$^7$ .............................. H04M 9/08; H04B 3/23
(52) U.S. Cl. ............................ 379/406.08; 379/406.12; 370/290; 370/291
(58) Field of Search ................... 379/406.01, 406.05, 379/406.06, 406.08, 406.09, 406.12, 420.02, 420.03; 370/286, 289, 290, 291

(56) References Cited

U.S. PATENT DOCUMENTS

| | | | |
|---|---|---|---|
| 4,956,838 A | * 9/1990 | Gilloire et al. | 370/32.1 |
| 5,136,577 A | 8/1992 | Amano et al. | 370/32.1 |
| 5,610,909 A | 3/1997 | Shaw | 370/291 |
| 5,631,899 A | * 5/1997 | Duttweiler | 370/291 |
| 5,818,945 A | * 10/1998 | Makino et al. | 381/66 |
| 5,841,856 A | * 11/1998 | Ide | 379/406.08 |
| 6,097,971 A | * 8/2000 | Hosoi | 455/570 |
| 6,108,412 A | * 8/2000 | Liu et al. | 379/410 |
| 6,181,753 B1 | * 1/2001 | Takada et al. | 375/346 |
| 6,181,794 B1 | * 1/2001 | Park et al. | 379/406.08 |
| 6,381,569 B1 | * 4/2002 | Sih et al. | 704/233 |
| 6,505,057 B1 | * 1/2003 | Finn et al. | 455/569 |

OTHER PUBLICATIONS

Patent Search conducted on Jul. 6, 1999, 38 pages.
"Adaptive Echo Cancellation for Speech Signals," M.M. Sondhi et al., *Advances in Speech Signal Processing*, published by Marcel Dekker, Inc., 1992, Chapter 11, pp. 327–355.
"Linear Prediction: A Tutorial Review," J. Makhoul, pp, 124–143 (reprinted from *Proceedings of the IEEE*, vol. 63, Apr. 1975, pp. 561–580).

* cited by examiner

*Primary Examiner*—Binh Tieu
(74) *Attorney, Agent, or Firm*—Gray Care Ware & Freidenrich LLP

(57) ABSTRACT

A system and method of Acoustic Echo Cancellation includes a digital filter used to estimate the echo path is split into 2 filters: one fixed infinite impulse response (IIR) filter and one adaptive finite impulse response (FIR) filter. The fixed filter models the composite frequency response of the loudspeaker, its cabinet enclosure and the direct coupling path between the loudspeaker and the microphone(s). The adaptive filter models the time varying characteristics of the indirect coupling path between the loudspeaker and microphone.

36 Claims, 10 Drawing Sheets

Figure 10. Fixed filter computation steps

ACOUSTIC ECHO PROCESSING SYSTEM

BACKGROUND OF THE INVENTION

This invention relates to communication systems and, more particularly, to acoustic echo canceler circuits.

Hands-free phone systems, sometimes referred as speakerphones, are used widely around the world for audio-conferencing. In such systems, acoustic echo results from the reflection of sound waves and acoustic coupling between the microphone(s) and loudspeaker. The speech of the far-end caller is transmitted by the loudspeaker and is picked up by the microphone after it bounces off the inside surfaces of the room. This echo disturbs the natural flow of a conversation, because if not suppressed, the caller will hear his or her own voice after some delay.

To solve this problem echo cancellation techniques based on Digital Signal Processing (DSP) are used to eliminate the echo and allow duplex communication. An echo canceler continuously estimates the echo path characteristic between the loudspeaker and microphone and subtracts an echo estimate from the real echo.

The impulse response of the echo path is a combination of several factors. The cabinets housing the loudspeakers and the loudspeakers themselves have specific acoustic characteristics (resonances) reflected in the echo path. The direct coupling between loudspeaker and microphone contributes to the echo path (direct path). Finally the environment where the sound bounces off makes its contribution to the echo path (indirect path).

Acoustics paths are sensitive to any change in the space around the acoustic transducers. For example the impulse response can vary in time as the user moves or if the acoustic environment changes because some object is placed, for example, near the microphone. For this reason the echo canceler must monitor and adapt continuously its estimate of the echo path.

The theory of operation of Acoustic Echo Cancelers is well depicted in Furui, S., "Advances in Speech Signal Processing", Marcel Dekker, Inc, New York, 1992, Chapter 11).

FIG. 1 illustrates a typical scenario for an Acoustical Echo Canceler and the different echo paths. Most of the commercial echo canceler systems use an Adaptive Filter 12 to estimate the echo path. The filter is implemented in software using a Digital Signal Processor connected to the acoustical transducers via Analog to Digital and Digital to Analog Converters 14, 16. Filter 12 is used to estimate the echoes caused by loud speaker 18, microphone 20, converters 14, 16 and the environment 22. The structure of the filter is normally a Finite Impulse Response (FIR) filter also known in the literature as "transversal" or "all zero" filter. FIR filters are stable under specific constraints and therefore are very popular in adaptive systems.

One of the disadvantages using FIR filters is that very long filters are required to model accurately the echo paths when spectral peaks (resonances) are present in the frequency domain. An Infinite Impulse Response (IIR) filter could be much suitable than a FIR filter for modeling spectral peaks, but stability problems arise when making this kind of filter adaptive.

Modifications to the single adaptive filter approach have been proposed. Amano, F. in U.S. Pat. No. 5,136,577 uses a sub-band structure to speed the convergence of the adaptive algorithm and to reduce the computation effort. Basically the echo signal is processed in several frequency sub-bands using analysis filters. After cancellation in each band the signal is reconstructed using synthesis filters. Shaw, D. in U.S. Pat. No. 5,610,909 and Duttweiler; D. in U.S. Pat. No. 5,631,899 disclose multistage echo cancelers in which two adaptive filters are used to model the echo path. The filters are connected in tandem and they model different time variant characteristics of the echo path. Both filters are adaptive and operate simultaneously but independently. In systems adapting with voice signals this may introduce uncertainty about when to adapt each filter specially when the first filter has no feedback from the second one.

SUMMARY OF THE INVENTION

This invention is based on the recognition that modeling of the intrinsic characteristics of the cabinet adversely affects the capability of the adaptive filter in modeling the impulse response of the room. Specifically when the coefficients are adapted using voice signals during a conversation in a conventional system, the filter must be reset very often due to misdetection of double talk conditions. Reset of the coefficients implies restarting the process of estimating the fixed characteristics and the time variant characteristics of the echo path from the beginning. Therefore, it is desirable to separate the modeling of the intrinsic characteristics of the cabinet from the adaptive modeling of the impulse response of the room so that the adaptive modeling of the dynamic environment in the room is not adversely affected by the modeling of the intrinsic and substantially fixed characteristics of the cabinet.

The modeling of the intrinsic characteristics of the loud speaker and microphone (as well as any cabinet that may be used) may be performed by an estimation of echos along a direct acoustic path between the loud speaker and the microphone. Information of this estimate may be used to derive a first signal. In one embodiment, the first signal may embody the estimate. In another embodiment, the first signal may embody the inverse of the estimate. A second signal may be provided as an estimation of echos caused by indirect paths through the environment. Preferably, the two signals may be provided by two separate and distinct filters. The effects of the echos may then be cancelled by means of the first and second signals.

By separating the modeling of echoes caused by the cabinet and its contents from the modeling of echoes caused by the environment, filters that may be used in the modeling process can be optimized. For example, since the acoustic characteristics of the cabinet and its contents do not typically change when the cabinet is used in the phone system, such characteristics may be modeled by means of a fixed IIR filter which is beneficial since a short filter may be used to accurately estimate the direct echo path. Since a filter used for estimating the echo caused by the environment does not need to also estimate echos caused by the cabinet box and its contents, such filter can also be simplified.

BRIEF DESCRIPTION OF THE DRAWINGS

For simplicity in description, identical components are labeled by the same numerals in this application.

BRIEF DESCRIPTION OF THE INVENTION

Figure 3:
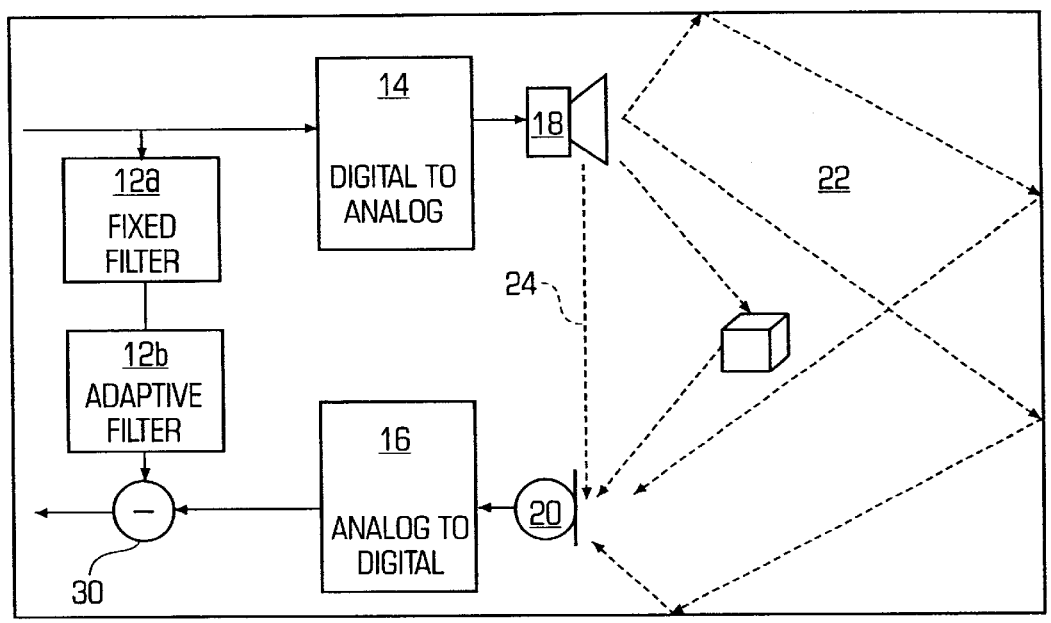
FIG. 3 depicts the filter structure proposed in the invention.

The preferred embodiment of an Echo Canceler structure used in this invention is depicted in FIG. 3. The invention separates the echo path estimation process into 2 steps. In the first step the contribution of hardware components (Analog-to-digital and Digital to Analog converters 14, 16), the cabinet box (not shown), loudspeaker 18, microphone 20 and the direct path coupling 24 is estimated using a fixed IIR filter 12a. In the second step the indirect path through the environment 22 is estimated using a FIR adaptive filter 12b. The basic assumption is that the first estimate is determined by the box structure and does not change in time. Therefore a fixed IIR filter 12a can be used to model this path contribution. The indirect path is time variable and therefore a FIR adaptive filter is used in the estimation process.

Figure 4:
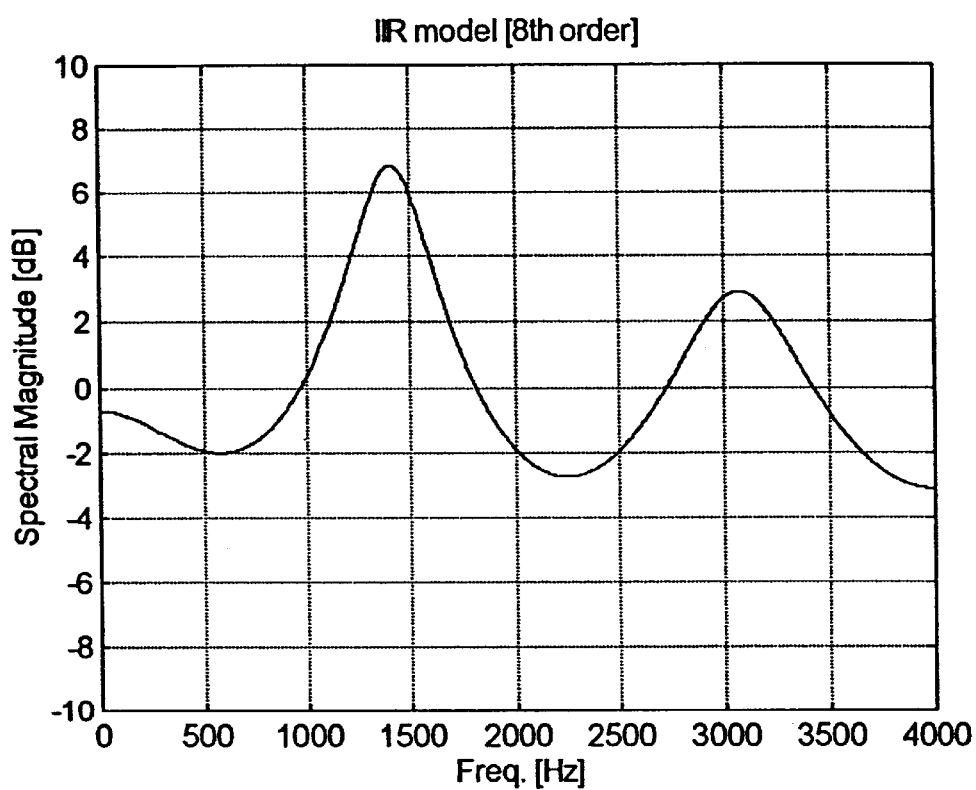
FIG. 4 illustrates the frequency response of an IIR filter of order 8 that models the cabinet characteristics.
Figure 5:
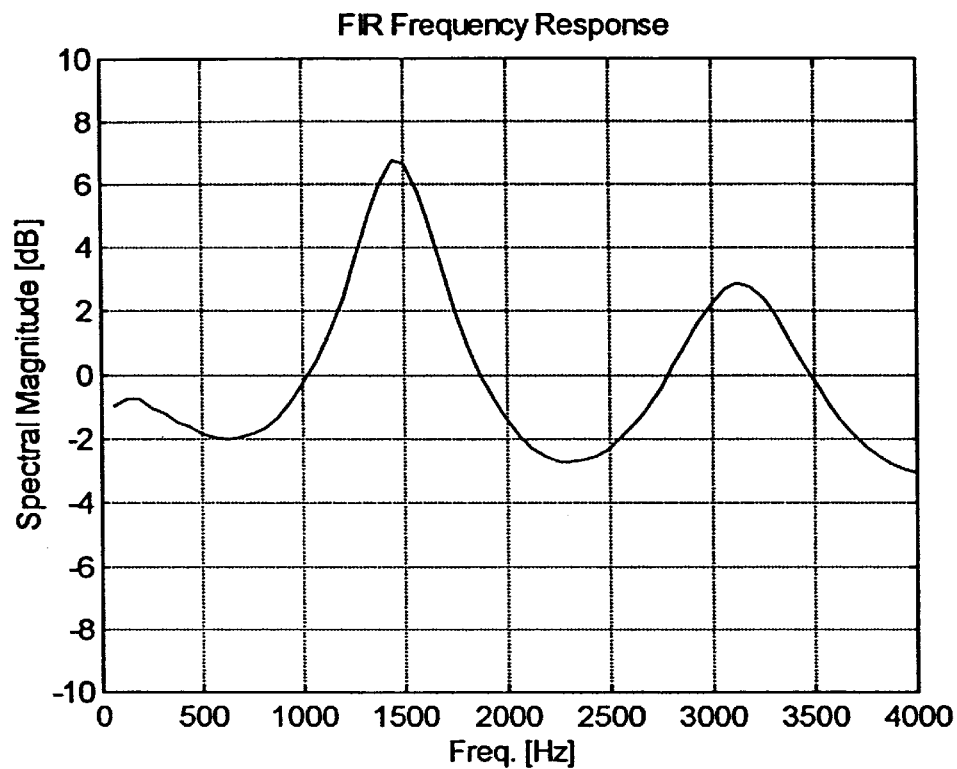
FIG. 5 illustrates the frequency response of a FIR filter of order 64 that models the cabinet characteristics.

The use of a fixed IIR filter (FIG. 4) is beneficial because a short filter (8th order) can be adequate to accurately estimate this part of the echo path, especially when spectral peaks are present in the frequency domain. Also, the box characteristics reflected by the fixed filter does not need to be adaptively estimated by the adaptive FIR filter. FIG. 5 shows the frequency response of a 64 tap FIR filter that otherwise would be necessary to obtain an accurate representation of the same spectral peaks in FIG. 4.

Figure 1:
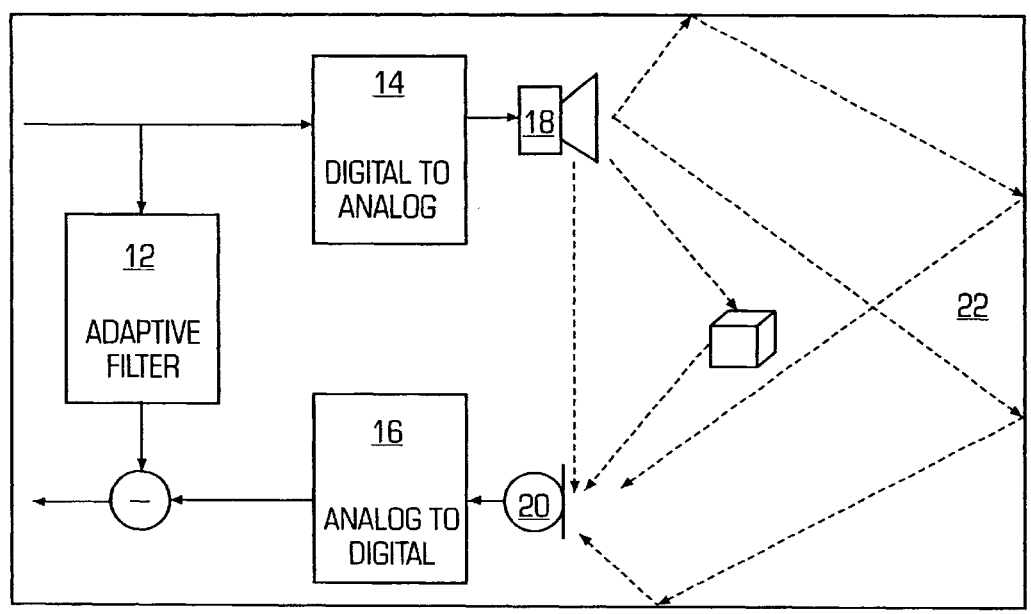
FIG. 1 illustrates a conventional Acoustical Echo Canceler and the different echo paths.
Figure 6:
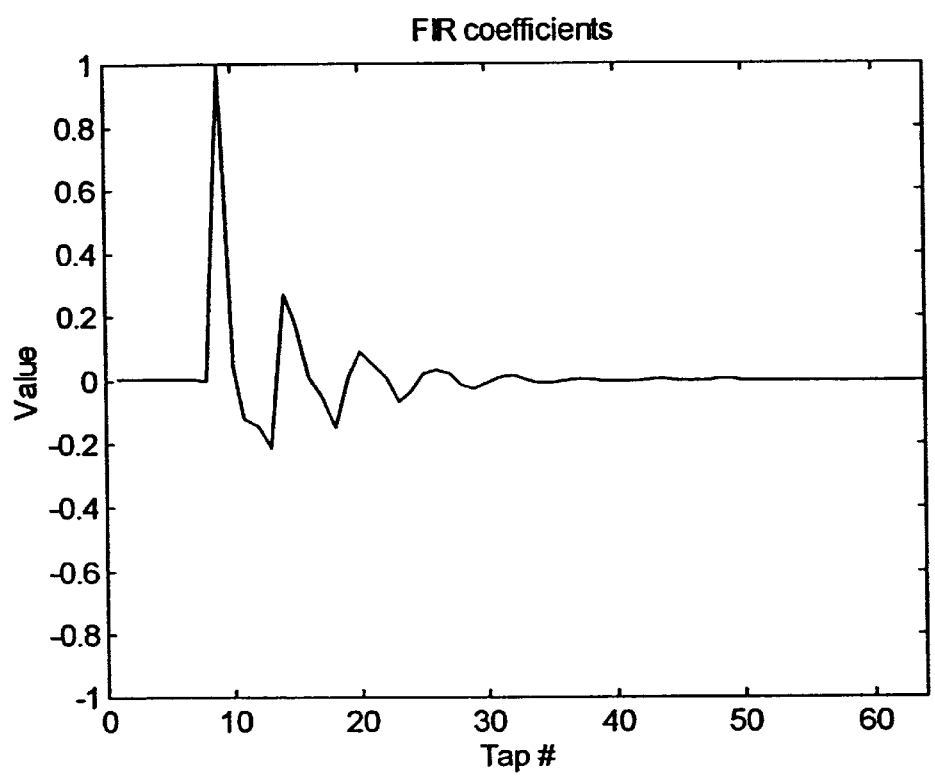
FIG. 6 illustrates the span of the FIR coefficient values.
Figure 7:
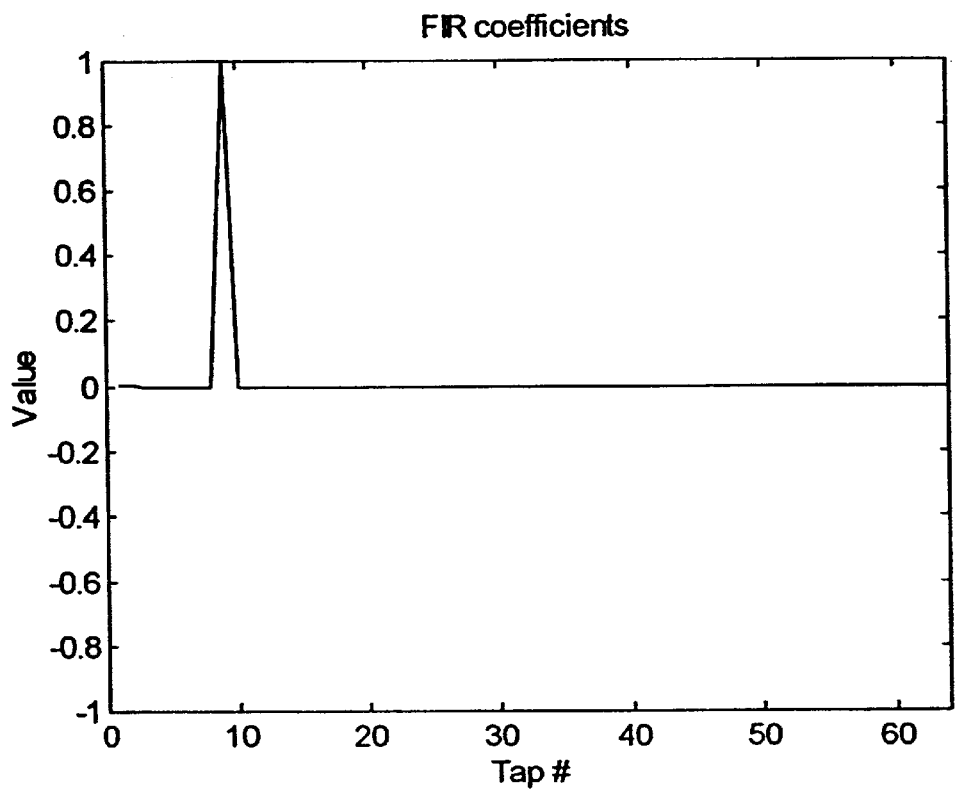
FIG. 7 illustrates the FIR filter when used in conjunction with a IIR filter.

The IIR filter 12a can be estimated at the production stage or at the initialization setup of the system and it will remain constant during operation of the hands free system. The adaptive filter 12b only needs to model the part of the echo path created by the environment. In this way the typical problem of time to initialize and adapt the adaptive filter coefficients can be reduced. The adaptive filter coefficients converge more rapidly to optimal values because they do not need to track fixed characteristics each time the filter is reset. FIG. 6 shows the impulse response of the FIR filter in the single filter approach taken in the conventional approach as in the arrangement of FIG. 1, while FIG. 7 shows the FIR impulse response in case the invention is used and a fixed IIR filter is introduced in series before the FIR filter. As is apparent from FIG. 7, the impulse response of the fixed FIR filter reduces to a delta function representing only the delay between the receive channel (loudspeaker) and transmit channel (microphone).

Figure 11:
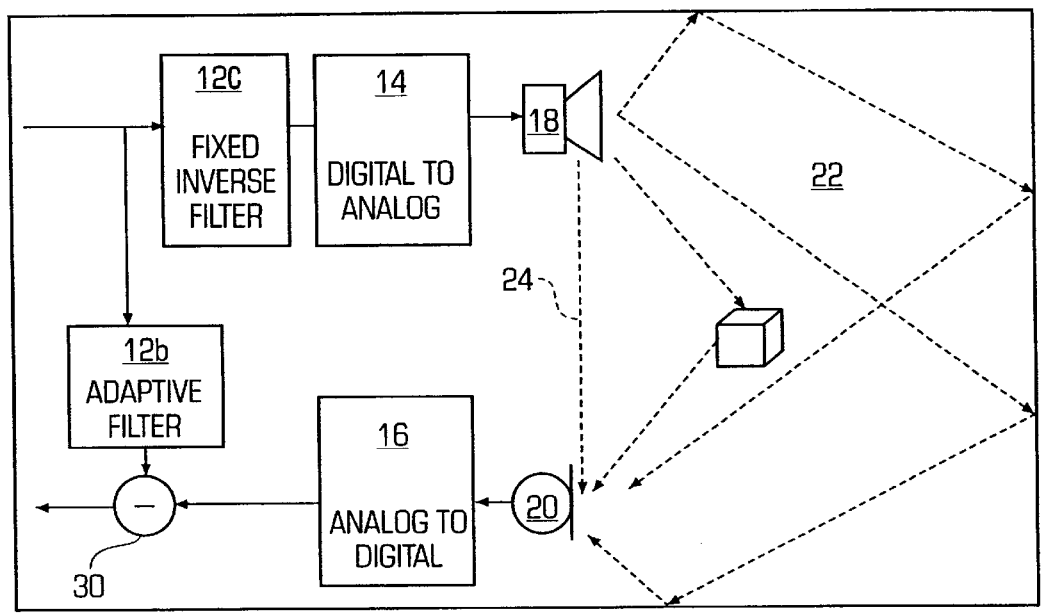
FIG. 11 depicts a filter structure proposed as an alternative embodiment of the invention.

In a different embodiment of the invention as shown in FIG. 11, the fixed filter 12c can be used to modify the frequency response of the cabinet box (not shown) and its contents 18 20 according to specific characteristics. In particular, by locating the inverse 12c of the fixed filter before the Digital to Analog section 14, frequencies of resonance of the box, its contents, and the A/D and D/A filter contribution can be eliminated from the sound reproduced by the loudspeaker 18 and picked up by the microphone 20. In that case the frequency response of the direct echo path 24 will be approximately flat and the adaptive filter 12b only needs to track the echo delay between loudspeaker and microphone. As a second example, if the system has to be used in a noisy environment, the voice intelligibility can be improved by boosting the high portion of the spectrum. In this case the fixed filter 12c should reflect the spectrum enhancement.

DETAILED DESCRIPTION OF THE PREFERRED EMBODIMENT

Figure 8:
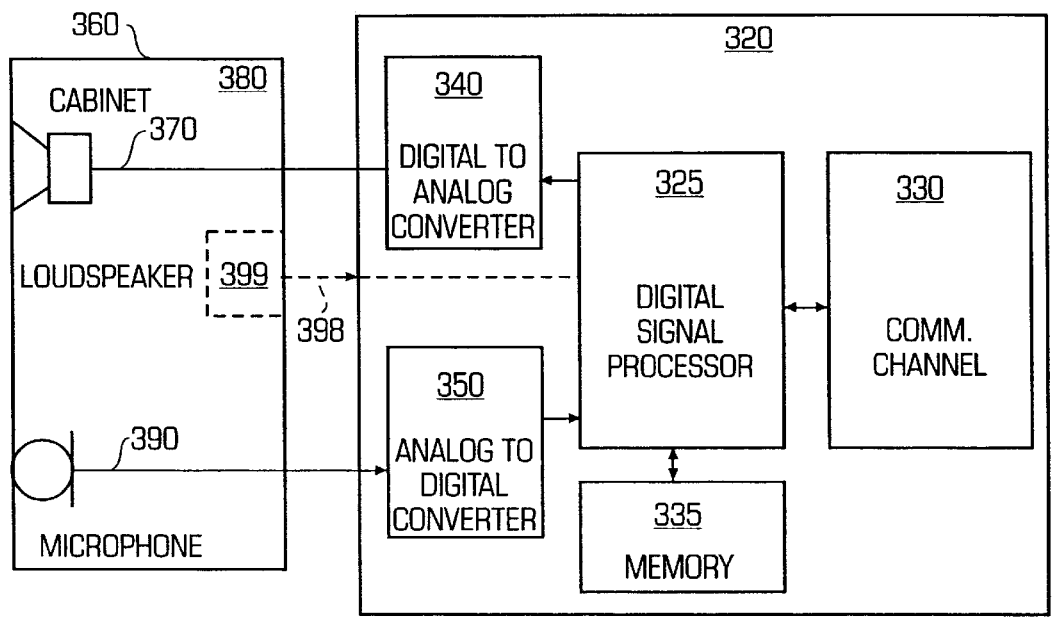
FIG. 8 is a block diagram showing the different hardware components of the Acoustic Echo Canceling System according to the present invention.

According to the invention the method includes two steps: first the fixed IIR filter 12a is estimated and in the second the fixed filter is placed between the reference signal (loudspeaker) and the adaptive FIR filter in order to perform the echo cancellation. Referring to FIG. 8 there is shown in accordance with the invention a block diagram showing the different components required in the implementation of the invention. The signal processing section 320 includes a Digital Signal Processor 325, a connection to a communication channel 330 that can be a regular analog telephone line or a digital PBX, program and data memory 335, a Digital to Analog Converter 340 and an Analog-to-digital Converter 350. The acoustic section 360 includes a loudspeaker 370, an acoustic cabinet 380 and a microphone 390.

The IIR filter estimation is performed as follows. The Digital Signal Processor 320 internally generates a short pulse of white noise. This signal is converted to the analog domain by means of the Digital to Analog Converter 340. The sampling frequency for this process is selected in such way that it is twice the maximum bandwidth of interest. For telephony application the bandwidth is 4 KHz. This is done according to the basic theory of sampling processes as is well known in the art. The loudspeaker 370 reproduces the white noise signal. The Loudspeaker-cabinet combination selectively affects the spectrum of the signal. The microphone 390 senses this signal which is in term digitized by the Analog-to-digital converter 350 and fed into the Digital Signal Processor's memory. To avoid effects of the environment on this IIR filter estimation process, sections 320, 360 may be placed in an anechoic chamber. Alternatively, only a small number of samples taken before echoes from the environment reach the microphone may be used for the estimation.

The Signal Processor 325 processes the signal stored in memory in order to estimate the filter's coefficients that provide optimal representation of the spectral characteristics of the system. A TMS320C54 manufactured by Texas Instruments, Inc (Dallas, Tex.) can be used as a Digital Signal Processor. The Analog-to-digital and Digital to Analog Converters can be found in a analog interface circuit as the TLC320AC02 also from Texas Instruments Inc. Any commercially available loudspeaker and microphone can be used as acoustics transducers.

Figure 9:
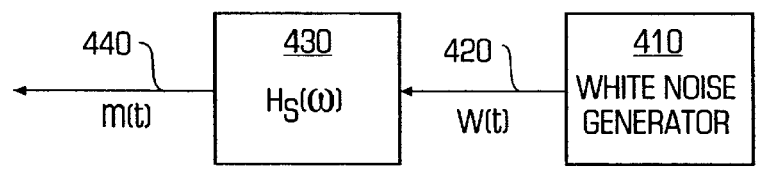
FIG. 9 illustrates the process of estimating the IIR fixed filter.

FIG. 9 is a block diagram describing the different filters associated with the IIR estimation process described above. The transfer function representing the loudspeaker/microphone-cabinet and converter (A/D, D/A) combination is represented by the filter 430 having the transfer function $H_s(\omega)$). The White noise generator 410 of Processor 325 creates the input white noise signal w(t) 420 which is filtered by $H_s(\omega)$ 430. A signal m(t) 440 is obtained after the filtering process. The signal m(t) 440 is picked up by the reference microphone and has a spectrum similar to the one depicted in FIG. 2.

Figure 2:
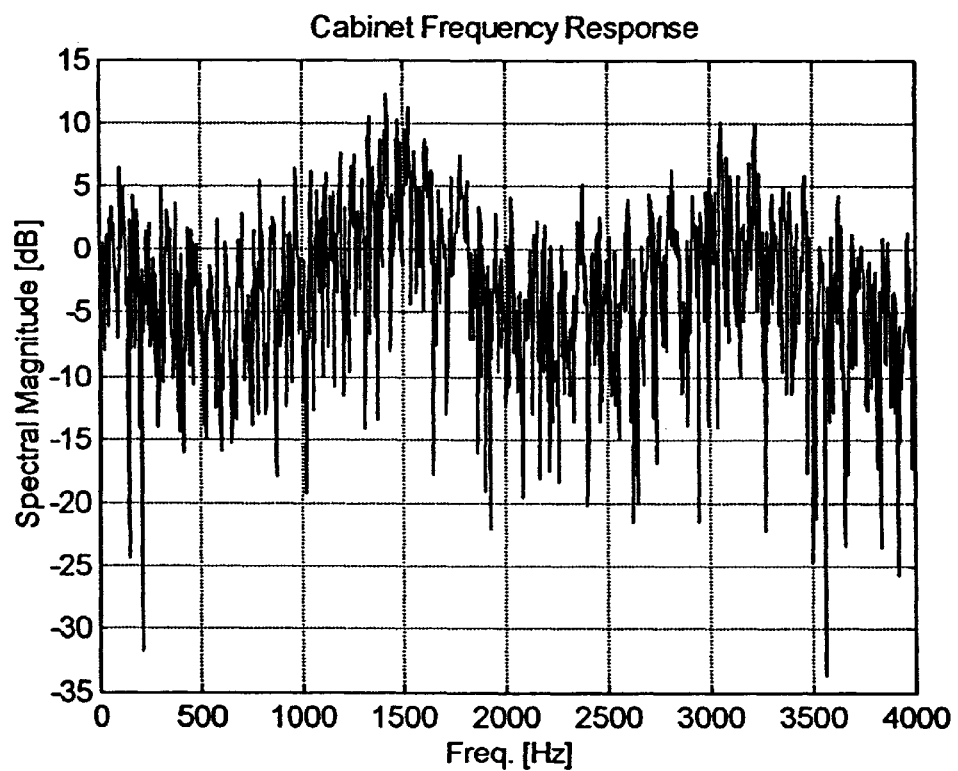
FIG. 2 illustrates the signal spectrum of White Noise after being reproduced by a loudspeaker housed in typical cabinet.

In FIG. 2 is shown an audio spectrum produced by a loudspeaker enclosed in a speakerphone box. A spectrum analyzer displays the frequency content of the signals sensed by the microphone, assuming that the loudspeaker and cabinet are located in an anechoic chamber and white noise is used as the sound source. If an ideal or perfect loudspeaker were used the spectrum analyzer would show the flat spectrum characteristic of white noise, but because of the selective nature of a real loudspeaker cabinet combination, the spectrum will show a series of resonant peaks.

Thus, typically, the spectrum at the output of the microphone will have several resonance peaks, so that the signal m(t) can be modeled by an Auto-regressive process presented by an all pole transfer function $H_{se}(\omega)$:

$$H_{se}(\omega) = \frac{\sigma_n}{1 - A(\omega)} \quad (1)$$

where $A(\omega)$ is a polynomial of order "p" and $\sigma_n$ is the variance of the white noise.

Such a model can be estimated using the Levinson-Durbin recursion. See "Linear Prediction: A tutorial review," J. Makhoul, *Proc. IEEE*, Vol. 63, April 1975, pp. 561–580, which is incorporated herein in its entirety by reference. See especially section II entitled "Parameter Estimation" of this article beginning on page 126. The order of the model is at least twice the number of peaks in the bandwidth of interest. Typical values for "p" are 8, 9 or 10. The polynomial coefficients are the IIR filter coefficients.

Figure 10:
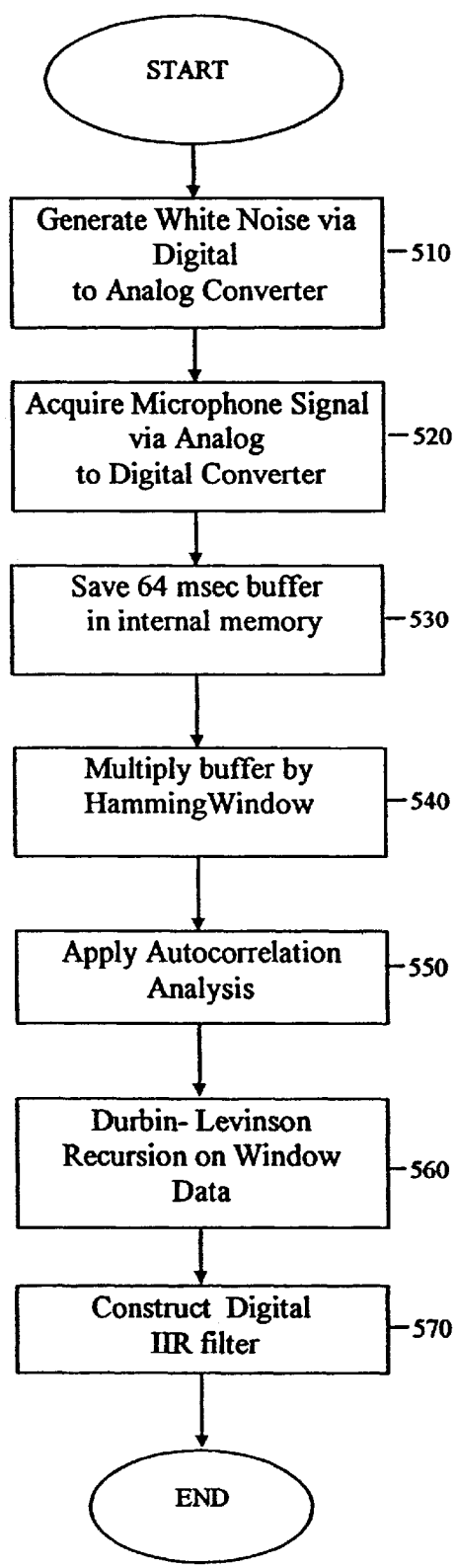
FIG. 10 is a flowchart depicting the sequence of processing steps performed by the digital signal processor estimating the fixed filter.

Referring now to FIG. 10, there is shown a flow chart illustrating the processing steps performed by the Digital Signal Processor to estimate the IIR filter coefficients.

At step 510 the processor generates random white noise via the Digital to Analog Converter interfaced to the Digital Signal Processor. The generated signal is reproduced by the loudspeaker and picked up by the reference microphone that is connected to the Analog-to-digital Converter. At step 520 the microphone signal is acquired via the Analog-to-digital Converter that is interfaced to the Digital Signal Processor. The sampled signal is saved in the internal memory. The saved data is stored in step 530 in a buffer of 64 msec. At 8000 KHz sampling rate this represent 512 data points at 512 different consecutive sampling times 1 through 512. An analysis window in step 540 multiplies the buffer. A Hamming window according to the following equation is used:

$$W_h(i) = \alpha + (1-\alpha)\cos(2\pi i/(M-1)) \quad (2)$$

where $\alpha=0.54$ and $M=512$. In other words, the ith data point taken at the nth sampling time, i ranging from 1 to 512, is multiplied by a corresponding factor $W_h(i)$ in equation (2) above.

An Autocorrelation analysis is applied in step 550 to the data points after the multiplication referred to above in connection to equation (2). Once the Autocorrelation coefficients are calculated the Levinson-Durbin recursion is computed in step 560. The previous signal processing steps are well known in the art and they are depicted in Makhoul, J a "Linear Prediction, a Tutorial Review", referenced above.

The resulting autoregressive coefficients are used to build the fixed filter at step 570. This is done according to the following equation:

$$S_{ref}(n) = S_{spk}(n) - a_1 S_{ref}(n-1) - a_2 S_{ref}(n-2) - \ldots - a_p S_{ref}(n-p) \quad (3)$$

where $S_{spk}(n)$ and $S_{ref}(n)$ represent samples at sampling time "n" of the speaker and filtered signals respectively, and p the order of the IIR filter. Similarly, $S_{ref}(n-1)$, $S_{ref}(n-2)$, ... $S_{ref}(n-p)$, represent samples at sampling times "n-1", "n-2", ..., "n-p" of the filtered signals at the output of filter. The filter coefficients are represented by the vector $[1\ a_1\ a_2, \ldots, a_p]$.

The difference equation 3 represents an Infinite Impulse Response (IIR) filter as is well known in the field. (Theory and applications of Digital Signal Processing, by Rabiner and Gold, Chapter 4). Once the coefficients are calculated for a specific loudspeaker cabinet combination they remain in memory for the adaptive filtering process of eliminating the echo signals.

The adaptive echo canceler is implemented according with one of the well known adaptive algorithms like the Normalized LMS. The filtering is modified to accommodate the IIR filter before the FIR filter. In other words, the output of the fixed IIR filter is supplied as input to the adaptive FIR filter.

Equation 4 is then used to calculate the FIR filter output:

$$\hat{e}(n) = \sum_{k=0}^{N-1} b_k * S_{ref}(n-k) \quad (4)$$

where

N=Number of filter taps in the FIR filter $b_k$=Filter coefficients $S_{ref}$=Filter delay line, that is, sampled output of the filter 12a in FIG. 3

$\hat{e}(n)$ =Estimated echo

The main difference being that instead of having the speaker signal fed to the delay line of the FIR filter we have the IIR filtered signal Sref being fed to the FIR delay line. The output of the FIR filter $\hat{e}(n)$ is the estimated echo. This estimate is subtracted from the real echo received via the microphone to obtain the error signal err(n) used in the adaptation process.

The adaptation of the FIR coefficients is done according to the NLMS algorithm as depicted in Equation 5.

$$b_k(n+1) = b_k(n) + \mu[\text{err}(n) S_{ref}(n)]/[P(n)] \quad (5)$$

where err(n)=Error signal given at the output of subtractor 30 by the difference between the output of the filter 12b and the output of the analog to digital converter 16 in FIG. 3

$\mu$=Adaptation step

P(n)=Estimated normalized $S_{ref}$ signal power (at the output of filter 12a)

After the coefficients $b_k$ of the filter 12b in Equation 4 have been derived, the values may be stored in memory 335 in FIG. 8 for providing the estimated echo in Equation 4 above. As shown in FIG. 3, this estimated echo $\hat{e}(n)$ may then be subtracted from the output of the analog-to-digital converter 16 to cancel the echos along the direct path 24 as well as along the indirect path through environment 22 from the output of converter 16. As shown in FIG. 3, this cancellation may be accomplished by means of a subtractor 30. In the embodiment of FIG. 8 where the two filters 12a, 12b are implemented by means of the digital signal processor 325, subtractor 30 may also be implemented by means of software in processor 325 as well. Instead of using a digital signal processor to implement filters 12a, 12b and subtractor 30, these components may also be implemented by other means such as Pentium processors from Intel® of Santa Clara, Calif. or through neural networks using non-processor based technology such as glue logic. Such and other implementations are within the scope of the invention.

As noted above in reference to FIG. 11, instead of feeding the output of fixed filter 12*a* to adaptive filter 12*b* as shown in FIG. 3, an inverse fixed filter 12*c* may be employed as shown in FIG. 11 where the output of filter 12*c* is fed to the digital-to-analog converter 14. As noted above, frequencies of resonance of the cabinet 380 and its contents 370, 390 and the filters 340, 350 of FIG. 8 can be estimated from the sound reproduced by the loud speaker 370 and picked up by the microphone 390. In that case, the frequency response of the direct echo path 24 in FIG. 11 will be approximately flat and the adaptive filter 12*b* only needs to track the echo delay between the loud speaker and the microphone. The process for deriving the coefficients of the fixed inverse filter 12*c* and the coefficients of the adaptive filter 12*b* is similar to that described above for the embodiment of FIG. 3 and will not be described in detail herein. The equations applicable for the embodiment of FIG. 11 are essentially the same as those set forth above for the embodiment of FIG. 3 except for equation (3). The equation (3') suitable for the embodiment of FIG. 11 in lieu of equation (3) is set forth below. The output of filter 12*c* in FIG. 11 is given by:

$$S_{spk}(n) = S_{ref}(n) + a_1 S_{ref}(n-1) + a_2 S_{ref}(n-2) + \ldots + a_p S_{ref}(n-p) \quad (3')$$

This is actually a FIR filter of order p with coefficients that are different from those of the FIR filter of FIG. 3 where the same cabinet is used for FIGS. 3 and 11. This filter will have spectral "valleys" where the cabinet and its contents have spectral "peaks" in such a way that the total system (Inverse filter+cabinet) has a flat frequency response. The output of filter 12*c* is an estimate of an echo signal resulting from a system which has the inverse frequency response characteristics of the cabinet. When this estimated echo signal passes through the cabinet, the characteristics of the cabinet are removed from the signal, resulting in a speech signal reaching the microphone which is "free" of cabinet echo effects. Unlike the embodiment of FIG. 3, where the estimated echo at the output of filter 12*a* and fed to filter 12*b* is subtracted from the speech signal by subtractor 30, the estimated echo at the output of filter 12*c* is fed to the cabinet and is cancelled by the cabinet through equalization. Thus, in both embodiments, filter 12*b* processes either an output of a fixed filter (e.g. 12*a*) or a signal derived therefrom (e.g. derived by the cabinet from the output of filter 12*c*) to obtain a second output signal which is then used for cancelling echoes. In both embodiments, the fixed filter derives an estimate related to echoes of the speech signal caused by the cabinet and its contents.

In still other embodiments, it may be possible to reverse the order of fixed filter 12*a* and adaptive filters 12*b* in FIG. 3. Such and other variations are within the scope of the invention.

As is common to the embodiments of FIGS. 3 and 8, the signals fed to the input of the loud speaker 18 and the signal fed to the input of the adaptive filter 12*b* are different. In the case of FIG. 3, the signal that is fed to loud speaker 18 is first filtered by the fixed filter 12*a* before it is applied to adaptive filter 12*b*. In the case of FIG. 11, the signal applied to adaptive filter 12*b* is filtered first by fixed inverse filter 12*c* before it is applied to loud speaker 18.

As noted above, it is possible to derive the coefficients of the fixed filter 12*a*, 12*c* of FIGS. 3 and 8 at the production stage using a system similar to that described above when the cabinet and its contents (loud speaker and microphone) are manufactured, or at the initialization set up of the systems of FIGS. 3 and 8 where such coefficients will remain constant during the operations of the hands-free system. Thus, it is possible for manufacturers to estimate the coefficients of such filter and store the coefficients in a medium having a memory, such as memory 399, which may be any one of the commonly used type of non-volatile memories such as an ROM, EPROM, EEPROM or flash memory. A suitable EEPROM that may be used is part number 24AA32 from Microchip Technology Inc. of Chandler, Ariz. While memory 399 may be enclosed within the cabinet 380 as shown in FIG. 8 and the coefficients stored therein read by processor 325, it is also possible to supply memory 399 in a form separate from the cabinet, such as in the form of a floppy disk or CD-ROM. In such instance, the digital signal processor 325 would read the coefficients from memory 399 along line 398 so that the coefficients of the fixed filter 12*a*, 12*c* need not be derived during the initialization of system 320. This is particularly convenient for those in the mass market who purchase sections 360, 320 separately and connect the two together. The digital signal processor would then only have to derive the coefficients of the adaptive filter 12*b* as described above.

While the invention has been described above by reference to various embodiments, it will be understood that changes and modifications may be made without departing from the scope of the invention, which is to be defined only by the appended claims and their equivalents. Thus, while the loud speaker and microphone are shown within a cabinet in the figures described above, other arrangements are possible. For example, for hands-free phone systems used in automobiles, the speakers may be housed within cabinets for enhanced sound quality while the microphones may be located outside of the cabinet. This invention may be used for any arrangement of the loud speaker, microphone with or without a cabinet, and however the loud speaker and microphone are housed by means of a cabinet. All of the articles and references referred to above are incorporated herein in their entirety by reference.

What is claimed is:

1. An acoustic echo canceller subsystem for use with a hands-free phone system in an environment, said system comprising a loud speaker that converts input speech electrical signals to acoustic signals to listener(s) in the environment and a microphone that converts acoustic signals in the environment to electrical signals; said subsystem comprising:

a fixed filter processing an input speech signal destined for the loudspeaker to provide a first output signal that is an estimation related to echoes of said input speech signal caused by the loud speaker and the microphone;

an adaptive filter processing the first output signal or a signal derived therefrom to obtain a second output signal that is an estimation of echoes caused by the environment; and a circuit processing an output of the microphone in response to the second output signal for canceling echoes.

2. The subsystem of claim 1, wherein said fixed filter provides the first output signal to the loudspeaker, said fixed filter being such that it substantially equalizes resonance peaks of a frequency response of the loudspeaker and microphone.

3. The subsystem of claim 1, wherein said fixed filter provides the first output signal to the adaptive filter.

4. The subsystem of claim 1, wherein said phone system includes a cabinet housing the loud speaker and the microphone, the fixed filter providing a first output signal that is an estimation of echoes of said input speech signal caused by the loud speaker, the microphone and the cabinet.

5. The subsystem of claim 1, wherein said fixed and adaptive filters form part of a digital signal processor, said system further comprising analog-to-digital and digital-to-analog converters converting signals from or to the processor, the fixed filter providing a first output signal that is an estimation of echoes of said input speech signal caused by the loud speaker, the microphone and the converters.

6. The subsystem of claim 1, wherein said fixed filter is an infinite impulse response filter.

7. The subsystem of claim 6, wherein said fixed filter is a pth order filter, p being 8, 9 or 10.

8. The subsystem of claim 1, wherein said adaptive filter is a finite impulse response filter.

9. A hands-free phone system in an environment, said system comprising:
- a loud speaker that converts input speech electrical signals to acoustic signals to listener(s) in the environment;
- a microphone that converts acoustic signals in the environment to electrical signals;
- a fixed filter processing an input speech signal destined for the loudspeaker to provide a first output signal that is an estimation related to echoes of said input speech signal caused by the loud speaker and the microphone;
- an adaptive filter processing the first output signal or a signal derived therefrom to obtain a second output signal that is an estimation of echoes caused by the environment; and
- a circuit processing an output of the microphone in response to the second output signal for canceling echoes.

10. The system of claim 9, wherein said fixed filter provides the first output signal to the loudspeaker, said fixed filter being such that it substantially equalizes resonance peaks of a frequency response of the loudspeaker and microphone.

11. The system of claim 9, wherein said fixed filter provides the first output signal to the adaptive filter.

12. The system of claim 9, further including a cabinet housing the loud speaker and the microphone, the fixed filter providing a first output signal that is an estimation of echoes of said input speech signal caused by the loud speaker, the microphone and the cabinet.

13. The system of claim 9, wherein said fixed and adaptive filters are implemented by means of a digital signal processor, said system further comprising analog-to-digital and digital-to-analog converters converting signals from or to the processor, the fixed filter providing a first output signal that is an estimation of echoes of said input speech signal caused by the loud speaker, the microphone and the converters.

14. The system of claim 9, wherein said fixed filter is an infinite impulse response filter.

15. The system of claim 14, wherein said fixed filter is a pth order filter, p being 8, 9 or 10.

16. The system of claim 9, wherein said adaptive filter is a finite impulse response filter.

17. A method for calibrating a loud speaker and a microphone in a hands-free phone system in an environment, the loud speaker converting input speech electrical signals to acoustic signals to listener(s) in the environment and the microphone converting acoustic signals in the environment to electrical signals; said method comprising:
- generating an electrical signal having a substantially flat frequency spectrum;
- causing the loud speaker to generate an acoustic signal in response to said electrical signal; and
- processing a signal provided by the microphone in response to the acoustic signal to derive parameters of a fixed filter that processes an input speech signal supplied to the loudspeaker to provide an output signal that is an estimation related to echoes of said input speech signal caused by the loud speaker and the microphone.

18. The method of claim 17, wherein said filter is implemented by means of a digital signal processor, wherein said processing derives coefficients of the filter, said method further comprising storing said coefficients of the filter in a non-volatile memory.

19. The method of claim 18, wherein said processing includes:
- multiplying the signal provided by the microphone by a window to provide a second signal;
- autocorrelating the second signal to provide autocorrelation coefficients; and
- computing coefficients of the filter from the autocorrelation coefficients, passing white noise.

20. The method of claim 19, wherein said multiplying includes multiplying the signal provided by the microphone by a Hamming window.

21. An acoustic echo canceller subsystem for use with a hands-free phone system in an environment, said system comprising a loud speaker that converts input speech electrical signals to acoustic signals to listener(s) in the environment and a microphone that converts acoustic signals in the environment to electrical signals, said loud speaker having an input; said subsystem comprising:
- a first filter processing an input speech signal destined for the loudspeaker and applied to the input of the first filter to provide a first output signal;
- a second filter having an input, said second filter processing the first output signal or a signal derived therefrom to obtain a second output signal; and
- a circuit processing an output of the microphone in response to the second output signal for canceling echoes, wherein the two filters and the loud speaker are connected so that the inputs of the second filter and of the loud speaker receive different input signals.

22. The subsystem of claim 21, wherein said first filter provides the first output signal to the loudspeaker, said first filter being such that it substantially equalizes resonance peaks of a frequency response of the loudspeaker and microphone.

23. The subsystem of claim 21, wherein said first filter provides the first output signal to the second filter.

24. The subsystem of claim 21, wherein said phone system includes a cabinet housing the loud speaker and the microphone, the first filter providing a first output signal that is an estimation of echoes of said input speech signal caused by the loud speaker, the microphone and the cabinet.

25. The subsystem of claim 21, wherein said filters form part of a digital signal processor, said system further comprising analog-to-digital and digital-to-analog converters converting signals from or to the processor, the first filter providing a first output signal that is an estimation of echoes of said input speech signal caused by the loud speaker, the microphone and the converters.

26. The subsystem of claim 21, wherein said first filter is an infinite impulse response filter.

27. The subsystem of claim 26, wherein said first filter is a pth order filter, p being 8, 9 or 10.

28. The subsystem of claim 21, wherein said second filter is a finite impulse response filter.

29. An acoustic subsystem for use with a hands-free phone system in an environment, said subsystem comprising:
- a loud speaker that converts input speech electrical signals to acoustic signals to listener(s) in the environment;
- a microphone that converts acoustic signals in the environment to electrical signals, said loud speaker having a first input; and
- a storage medium storing coefficients of a fixed filter useful for processing an input speech signal destined for the loudspeaker to provide a first output signal that is an estimation related to echoes of said input speech signal caused by the loud speaker and the microphone.

30. The subsystem of claim 29, wherein said phone system includes a cabinet housing the loud speaker and the microphone, the filter providing a first output signal that is an estimation of echoes of said input speech signal caused by the loud speaker, the microphone and the cabinet.

31. The subsystem of claim 29, wherein said filter forms part of a digital signal processor, said system further comprising analog-to-digital and digital-to-analog converters converting signals from or to the processor, the filter providing a first output signal that is an estimation of echoes of said input speech signal caused by the loud speaker, the microphone and the converters.

32. The subsystem of claim 29, wherein said storage medium includes a non-volatile memory.

33. A method of canceling echoes in a hands-free phone system in an environment, said system comprising a loud speaker that converts input speech electrical signals to acoustic signals to listener(s) in the environment and a microphone that converts acoustic signals in the environment to electrical signals; comprising:
- providing a first signal that is a fixed filtering estimation related to echoes along a direct acoustic path between the loud speaker and the microphone;
- providing a second signal that is an adaptive filtering estimation of echoes caused by the environment substantially exclusive of echoes along the direct path; and
- cancelling effects of the echoes of input speech signals by means of the first and second signals.

34. The method of claim 33, wherein said second signal is provided in response to the first signal or a signal derived therefrom, and wherein effects of the echoes of input speech signals are cancelled using the second signal.

35. The method of claim 34, wherein the first signal is provided using a fixed infinite impulse response filter.

36. The method of claim 34, wherein the second signal is provided using an adaptive finite impulse response filter.

* * * * *